United States Patent
Kweon et al.

(10) Patent No.: US 8,122,162 B2
(45) Date of Patent: Feb. 21, 2012

(54) METHOD OF OPTIMIZED-SHARING OF MULTIMEDIA CONTENT AND MOBILE TERMINAL EMPLOYING THE SAME

(75) Inventors: Ji-Hyeon Kweon, Yongin-si (KR); Yong-Gook Park, Yongin-si (KR); Hyun-Jin Kim, Seoul (KR); Myung-Hyun Yoo, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 13/181,973

(22) Filed: Jul. 13, 2011

(65) Prior Publication Data

US 2011/0269400 A1    Nov. 3, 2011

Related U.S. Application Data

(63) Continuation of application No. 12/348,453, filed on Jan. 5, 2009, now Pat. No. 8,001,291.

(30) Foreign Application Priority Data

Jan. 7, 2008 (KR) .................. 10-2008-0001864

(51) Int. Cl.
*G06F 3/00* (2006.01)
*G06F 15/177* (2006.01)
*G06F 15/16* (2006.01)

(52) U.S. Cl. ............. 710/15; 710/16; 710/17; 710/18; 710/19; 709/220; 709/227

(58) Field of Classification Search ............... None
See application file for complete search history.

(56) References Cited

U.S. PATENT DOCUMENTS

2007/0167174 A1* 7/2007 Halcrow et al. ........... 455/456.2
* cited by examiner

*Primary Examiner* — Alan Chen
(74) *Attorney, Agent, or Firm* — Jefferson IP Law, LLP

(57) ABSTRACT

An apparatus and method for displaying information using a mobile terminal connectable to peripheral devices through corresponding wireless communication is provided. The method includes receiving profile information from one or more of the peripheral devices connected through the corresponding wireless communication, each received profile information having identification information identifying the corresponding one or more peripheral devices and content information on the corresponding one or more peripheral devices, and listing the received profile information organized according to signal strength of the one or more peripheral devices from which the profile information is received.

20 Claims, 4 Drawing Sheets

METHOD OF OPTIMIZED-SHARING OF MULTIMEDIA CONTENT AND MOBILE TERMINAL EMPLOYING THE SAME

CROSS-REFERENCE TO RELATED APPLICATION

This application is a continuation application of U.S. patent application Ser. No. 12/348,453 filed on Jan. 5, 2009, which claims the benefit of Korean Patent Application No. 10-2008-0001864, filed on Jan. 7, 2008 in the Korean Intellectual Property Office, the disclosure of each of which is incorporated herein in its entirety by reference.

BACKGROUND OF THE INVENTION

1. Field of the Invention

Aspects of the present invention relate to a mobile terminal system capable of performing short-range wireless communications, and more particularly, to a method of optimized-sharing of multimedia content that allows delivery of optimized multimedia content by using device profiles shared between devices connected via short-range wireless communication and a mobile terminal employing the same.

2. Description of the Related Art

In recent years, mobile terminals (such as cellular phones, personal digital assistants (PDAs), and camcorders) have increasingly become popular. With advances in communication technology, mobile terminals have evolved to provide diverse supplementary functions such as games using various images and sounds, alarm clock and MP3 player functions, in addition to their basic communication functions such as making and receiving phone calls and providing a short message service (SMS). Therefore, a user can enjoy a wide variety of services in addition to the basic telephone functions.

Despite the increased convenience in terms of use, a user had to access a network via an intermediate device (such as a personal computer (PC) or base station system) in order to share various types of content data that can be stored in a mobile terminal, including music files, ringtones, images, and motion videos. Thus, a user can only use content data that is downloaded from Wireless Application Protocol (WAP) or Web sites. However, downloading content via a wired/wireless network in this way causes user inconvenience as well as a tremendous waste of time and economic loss for the user.

SUMMARY OF THE INVENTION

Aspects of the present invention provide a method of optimized sharing of multimedia content, which allows delivery of optimized multimedia content by using profile information shared between devices via short-range wireless communication.

Aspects of the present invention also provide a mobile terminal employing the above method of optimized sharing of multimedia content.

According to an aspect of the present invention, a method for displaying information using a mobile terminal connectable to peripheral devices through corresponding wireless communication is provided. The method includes receiving profile information from one or more of the peripheral devices connected through the corresponding wireless communication, each received profile information having identification information identifying the corresponding one or more peripheral devices and content information on the corresponding one or more peripheral devices, and listing the received profile information organized according to signal strength of the one or more peripheral devices from which the profile information is received.

According to another aspect of the present invention, a mobile terminal, connectable to peripheral devices through corresponding wireless communication, for displaying information, is provided. The mobile terminal includes a communication unit for establishing and maintaining wireless connections with one or more peripheral devices through corresponding wireless communication, and a controller for receiving profile information from the one or more peripheral devices connected through the corresponding wireless communication, each received profile information having identification information identifying the corresponding one or more peripheral devices and content information on the corresponding one or more peripheral devices, and for listing the received profile information organized according to signal strength of the one or more peripheral devices from which the profile information is received.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
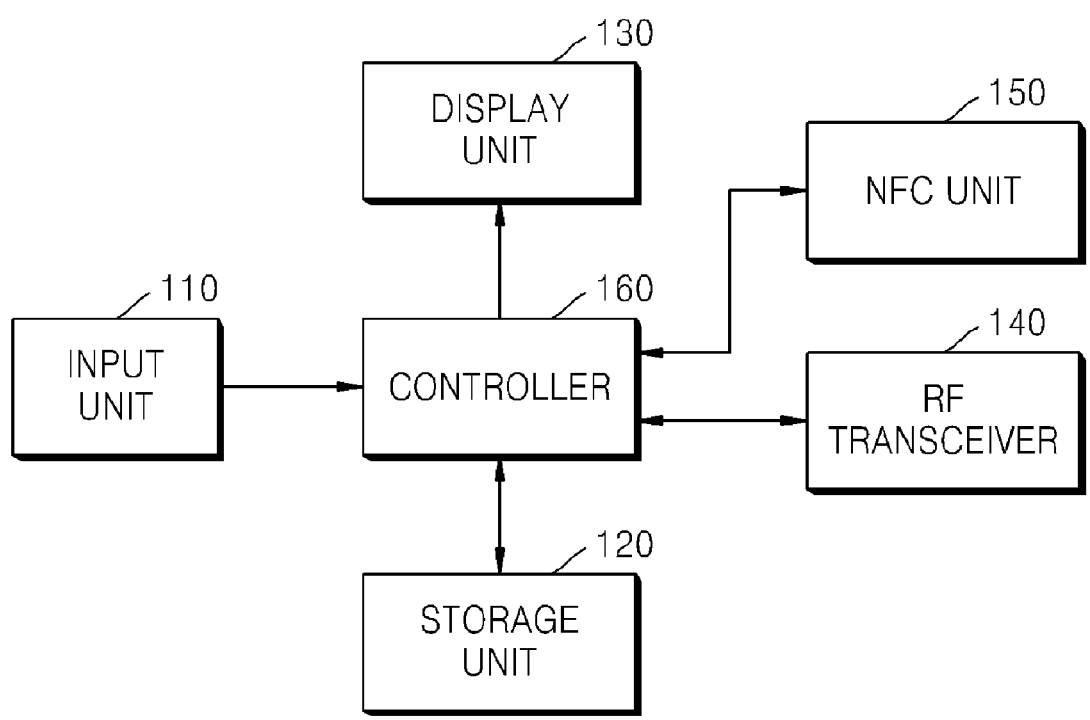
FIG. 1 is a block diagram of a mobile terminal designed to enable optimized sharing of multimedia content according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a mobile terminal designed to enable optimized sharing of multimedia content according to an embodiment of the present invention. Referring to FIG. 1, the mobile terminal includes an input unit 110, a storage unit 120, a display unit 130, a radio frequency (RF) transceiver 140, a Near Field Communication (NFC) unit 150, and a controller 160. It is understood that the mobile terminal can include additional elements, such as detachable media and/or optical systems. Further, the controller 160 can be a processor or a collection of processors.

The input unit 110 is a keypad or touch screen. The input unit 110 includes a plurality of numeric/character keys, function keys for allowing a user to interface with the mobile terminal, and keys for making/receiving a call. In particular, a user uses a predetermined button in the input unit 110 to select desired information or a content item from profile information about devices or a list of content items.

The storage unit 120 includes a read-only memory (ROM) for storing a plurality of programs and data, and an audio memory which is rewritable. In particular, the storage unit 120 stores downloaded content and shared profile information about devices created by the controller 160. While described has having a ROM, it is understood that the memory can be rewritable to allow updating of the programs and data in addition to or instead of a ROM. Further, the storage unit 120 can include video memory in addition to the audio memory for storing video or images, and the audio and video memories can be combined in other aspects such that the partition of the memory for storing data is not specifically limited.

The display unit 130 may be a liquid crystal display (LCD), an organo-electro luminescent display (OLED), or any device through which text and/or images can be displayed. The display unit 130 outputs various display data and text messages generated by the controller 160. In particular, the display unit 130 displays profile information about devices and a list of content items generated by the controller 160 in order of priority. Moreover, where the input unit 110 is a touch screen display, the display unit 130 and the input unit 110 can be combined.

The RF transceiver 140 modulates a signal generated by the controller 160 into a signal having a desired frequency band for amplification. The RF transceiver 140 amplifies an RF signal being received via a network and demodulates the RF signal into a signal having a desired frequency band.

The NFC unit 150 includes an NFC chip. Upon connecting with peripheral devices via the NFC chip, the NFC unit 150 exchanges data necessary for a communication setup so as to perform short-range wireless communication. Examples of such short-range wireless communication can include Bluetooth or Infrared Data Association (IrDA), but is not limited thereto.

When the NFC unit 150 is connected to peripheral devices via a network, the controller 160 controls the RF transceiver 140 to exchange profile information with the peripheral devices. The controller 160 also controls the display unit 130 to display profile information about the peripheral devices in order of network distance between the mobile terminal and each of the connected peripheral devices. Upon selecting profile information about each of the peripheral devices displayed, the controller 160 controls the display unit 130 to arrange and display a list of content items pertaining to the peripheral device, which can be shared and played back, in order of priority. While described in terms of sorting by distance, it is understood that other criteria can be used to sort, such as signal strength or if the profiles is of a known person. Further, while limited thereto, the content items which are sharable can be music, video, images, and/or other non-audio/video data.

Figure 2:
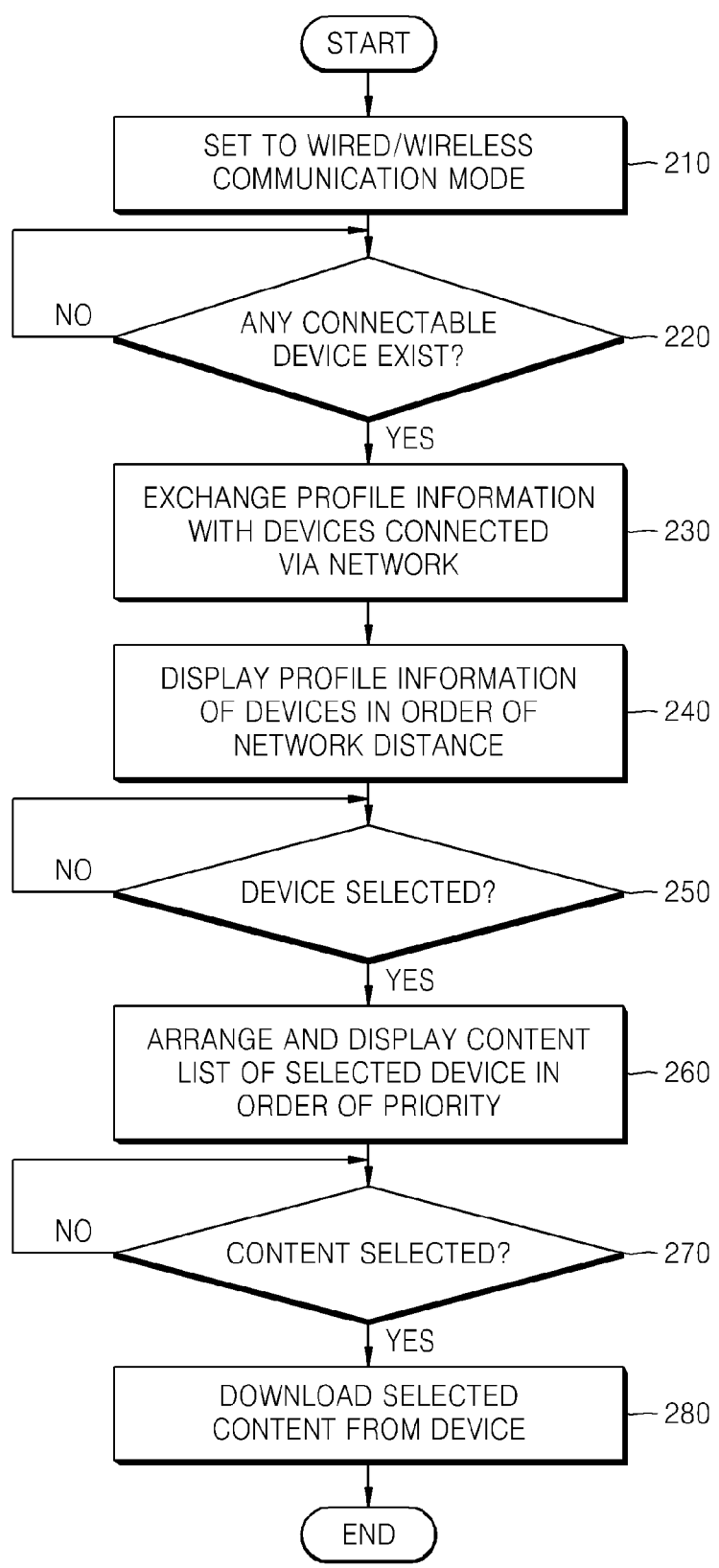
FIG. 2 is a flowchart illustrating a method of optimized sharing of multimedia content in a mobile terminal according to an embodiment of the present invention.

FIG. 2 is a flowchart illustrating a method of optimized sharing of multimedia content in a mobile terminal according to an embodiment of the present invention. Referring to FIG. 2, if a device is powered on, the mobile terminal is set to a short-range wired/wireless communication mode (Operation 210). The short-range wired/wireless communication may be Bluetooth or IrDA communication. Bluetooth enables a connection or communication between devices within a range of 10 m to 100 m regardless of the presence of an obstacle. IrDA communication typically operates within a range of 1 m and is directional, enabling the transfer of data in a certain direction. However, other protocols can be used, such as those using Ultra-Wide Band (UWB) and/or Wibree technologies.

After having been set to the short-range wired/wireless communication mode, the mobile terminal is connected to peripheral devices having short-range wired/wireless communication protocols via a network. For example, referring to FIG. 3A, a user's mobile terminal 310 may be connected to peripheral devices 320, 330, and 340 having Bluetooth protocols via a network. As shown, the devices are a camera 320, a portable computer 330, and a camcorder 340. However, the peripheral devices are not limited thereto and can include personal digital assistants, telephones, and portable or non-portable audio/video recording and/or reproducing apparatuses.

The user's mobile terminal 310 then checks whether a peripheral device that can be connected using a short-range wired/wireless communication protocol exists (Operation 220). For example, referring to FIG. 3A, the user's mobile terminal 310 performs an inquiry scan using a service discovery profile to discover other devices that can be accessible within its wireless communication range. The user's mobile terminal 310 also performs the inquiry scan to check whether there is another Bluetooth device within the Bluetooth communication range.

If a peripheral device that can be connected using a short-range wired/wireless communication protocol exists in operation 200, the user's mobile terminal 310 is then set to a content sharing mode so that it can receive profile information about peripheral devices connected via a wired/wireless communication network and send its profile information (Operation 230). The profile information includes user information, a manufacturer's name and device model number, file extensions associated with content, the number of shared files, and other information. However, it is understood that the profile information can include additional information in addition to or instead of the shown information, or can be limited to the user information and a listing of contents and content types available for sharing.

Figure 3A:
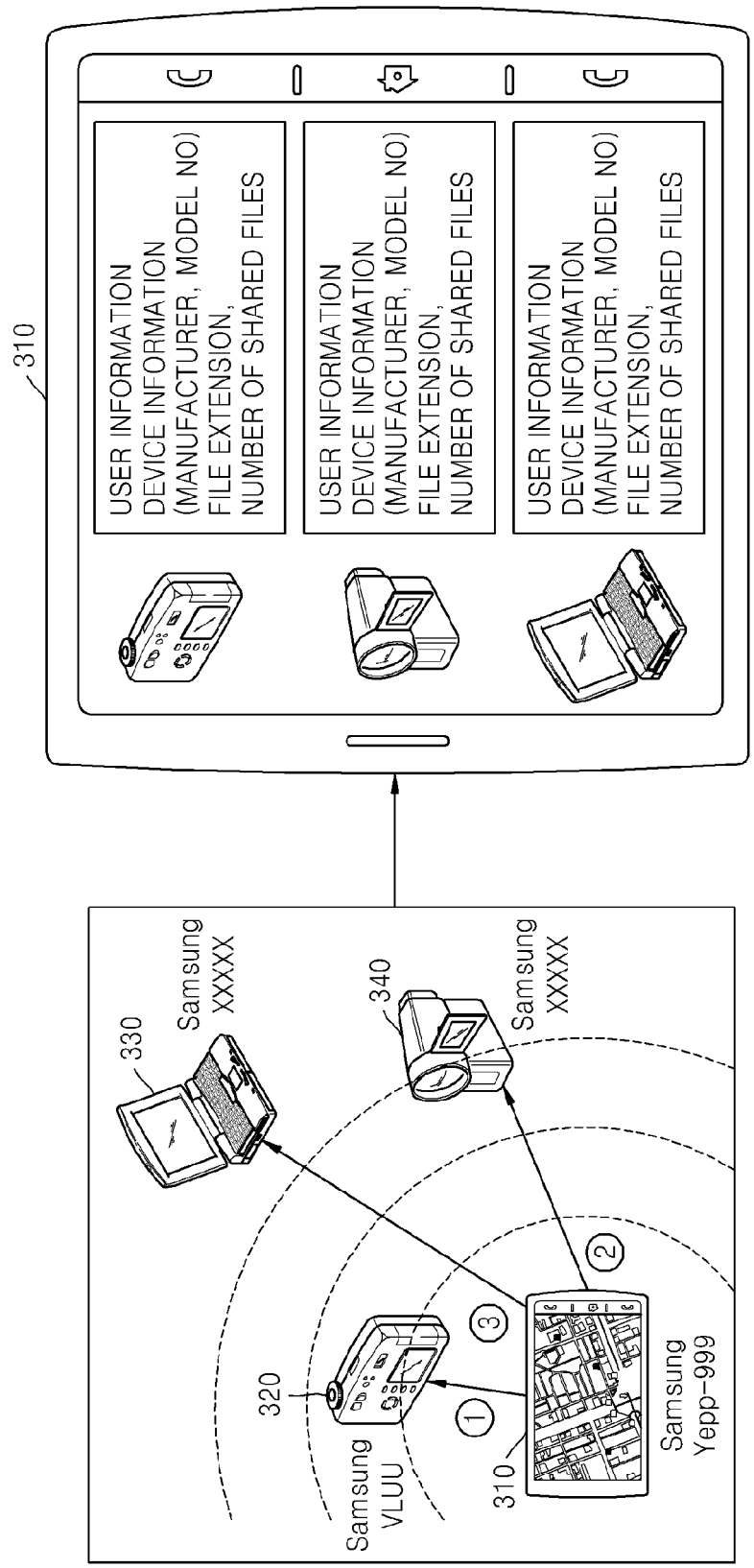
FIG. 3A illustrates a screen of a mobile terminal on which shared profile information of each device is displayed in order of network distance from the mobile terminal, i.e., from closest to farthest therefrom.

For example, as shown in FIG. 3A, the user's mobile terminal 310 may exchange location information, user information, a manufacturer's name and device model number, file extensions associated with content, and the number of shared files with each of the devices 320, 330, and 340 by using Bluetooth or IrDA communication. Thus, devices having short-range wired/wireless communication protocols can share profile information about the respective devices with one another. While not required, it is understood that security protocols can be set up to prevent exchanging profile information with unknown peripheral devices, such as requiring a user to accept a request for exchange of profile information.

Subsequently, the user's mobile terminal 310 displays profile information about the respective peripheral devices, which is shared with the peripheral devices, according to network distance (or network accessibility) (Operation 240). For example, if the peripheral devices 320, 330, and 340 are connected to the user's mobile terminal 310 via a short-range wireless network as shown in FIG. 3A, the user's mobile terminal 310 first determines network distances of the respective peripheral devices 320, 330, and 340 therefrom by using location information received from the peripheral devices 320, 330, and 340. The user's mobile terminal 310 then displays profile information about first through third peripheral devices 320, 330, and 340 that are respectively located closest (①), second closest (②), and third closest (③) thereto at the top, middle, and bottom of the screen, as shown on the right side of FIG. 3A. In this case, the profile information about the respective peripheral devices 320, 330, and 340 may be displayed in graphic images, characters, or other various ways.

The user's mobile terminal 310 then checks whether profile information about a device whose content it desires to share is selected from among profile information about the respective devices displayed (Operation S250). If the profile information about the desired device is selected, the user's mobile terminal 310 arranges and displays a list of content items pertaining to the device, which can be shared and played back, in order of priority (Operation 260). In this case, the user's mobile terminal 310 preferentially displays multimedia content items that do not violate another's copyright. If the user selects a content item that violates another's copyright or that he/she has no legal right to use, the user's mobile terminal 310 also has to display shareable purchase/source information about the selected content item. Furthermore, the user's mobile terminal 310 displays information about file sizes of content items that can be changed from original file sizes received from the peripheral devices.

Figure 3B:
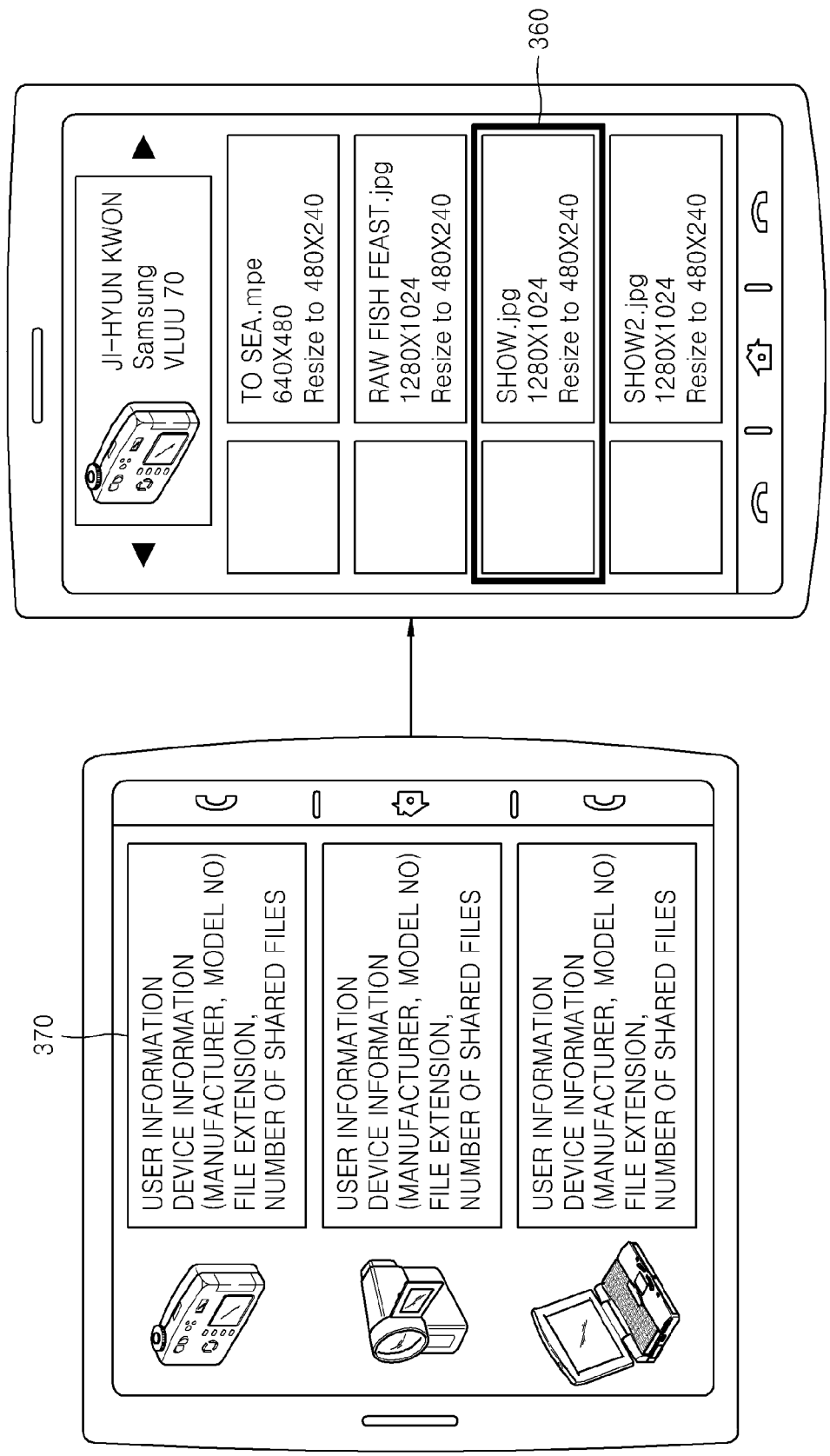
FIG. 3B illustrates a screen of a mobile terminal on which a list of multimedia content items that can be shared and played back is displayed in order from closest to farthest from the mobile terminal.

Referring to FIG. 3B, if a specific device 370 is selected on the screen of the user's mobile terminal 310, the user's mobile terminal 310 determines a priority order in which multimedia content being shared with the specific device 370 can be optimally reproduced based on metadata associated with the multimedia content. Examples are metadata related to file extensions, file sizes, and DRM (Digital Rights Management) protection. For example, it is assumed that the user's mobile terminal 310 can play back motion videos and still images at a file size of 480×240 pixels. In this case, shared profile information about the selected device 370 includes "to sea.mpe" of 680×480 pixels, "raw fish feast.jpg" of 1280× 1024 pixels, "show.jpg" of 1280×1024 pixels, and "show2.jpg" of 1280×1024 pixels.

After determining the priority order of the multimedia content, the user's mobile terminal 310 then arranges a list of multimedia content items that can be shared and played back according to the priority order based on information received from the desired device 370, such as the information on the file extension, file size, and DRM protection associated with each content item. Referring to FIG. 3B, the user's mobile terminal 310 determines "to sea.mpe" with no DRM that is the most suitable for its screen size and playback format, "raw fish feast.jpg", "show.jpg", and "show2.jpg" as the first through fourth priority items. The user's mobile terminal 310 also displays metadata associated with each content item in order of the determined priority. The metadata associated with each content may include metadata related to a file name, file extension, current file size, resize dimension, and other information.

Returning to FIG. 2, the user's mobile terminal 310 checks whether the desired content item is selected from a displayed list of multimedia content items (Operation 270). If the user selects the desired content that can be shared and played back, the user's mobile terminal 310 downloads the content item from the device (Operation 280).

The user's mobile terminal 310 also transforms the profile information about the selected content item, such as information on the file size and file extension, into profile information suitable for the user's mobile terminal 310 before downloading and playing back the content item. For example, as shown in FIG. 3B, if the user's mobile terminal 310 selects "show.jpg" 360 from content items displayed, the original "1280×1024" pixel file size is resized to a "480×240" pixel file size optimized for a screen size of the user's mobile terminal 310 before downloading. A file size can be either increased or reduced using a known file conversion program.

Similarly, file types can be converted between formats (such as between JPEG and TIFF or MP3 and AAC) so as allow greater exchange of files.

As described above, according to aspects of the present invention, profile information can be shared between devices connected via short-range wireless communication, thereby allowing delivery of optimized multimedia content to users of the devices using the shared profile information. Aspects of the present invention also allow multimedia content that a user desires to share to be automatically converted into multimedia content suitable for an environment of the user's device, thereby providing playing back of the multimedia content in an optimized environment.

While not required, aspects of the invention can be embodied as computer readable code on one or more computer readable recording medium for use with one or more processors and/or computers. The computer readable recording medium is any data storage device that can store data which can thereafter be read by a computer system. Examples of the computer readable recording medium include read-only memory (ROM), random-access memory (RAM), CD-ROMs, magnetic tapes, hard disks, floppy disks, flash memories, and optical data storage devices. Moreover, aspects allow transmission of the code in carrier waves (such as data transmission through the Internet). The computer readable recording medium can also be distributed over network coupled computer systems so that the computer readable code is stored and executed in a distributed fashion.

While this invention has been particularly shown and described with reference to preferred embodiments thereof, it will be understood by those of ordinary skill in the art that various changes in form and details may be made therein without departing from the spirit and scope of the invention as defined by the appended claims. Therefore, the scope of the invention is defined not by the detailed description of the invention but by the appended claims, and all differences within the scope and equivalents thereof will be construed as being included in the present invention.

What is claimed is:

1. A method for displaying information using a mobile terminal connectable to peripheral devices through corresponding wireless communication, the method comprising:
    receiving profile information from one or more of the peripheral devices connected through the corresponding wireless communication, each received profile information having identification information identifying the corresponding one or more peripheral devices and content information on the corresponding one or more peripheral devices; and
    listing the received profile information organized according to signal strength of the one or more peripheral devices from which the profile information is received.

2. The method of claim 1, further comprising listing the content information identified in the received profile information organized according to the identification information in the received profile information for each of the one or more peripheral devices so as to allow a user to identify sharable content on each of the corresponding one or more peripheral devices.

3. The method of claim 2, wherein the listing of the content information comprises listing the content information according to a priority of content items based on the profile information received from the one or more peripheral devices.

4. The method of claim 1, wherein the received profile information is displayed in order of signal strength for the one or more peripheral devices.

5. The method of claim 1, wherein the receiving of the profile information comprises connecting to the one or more peripheral devices using a short-range wireless communication protocol.

6. The method of claim 1, further comprising, when at least one of the listed profile information is selected, displaying the content information identified in the selected profile information so as to allow the user to identify the sharable content on the peripheral device corresponding to the selected profile information.

7. The method of claim 1, wherein the listing of the received profile information according to the signal strength comprises detecting distance information for each of the one or more peripheral devices, and listing the received profile information according to a distance of the corresponding one or more peripheral devices to the mobile terminal.

8. The method of claim 1, wherein the listing of the received profile information comprises listing the profile information about the one or more peripheral devices in ascending order of their network distances from the mobile terminal.

9. The method of claim 1, wherein the receiving of the profile information comprises transmitting profile information of the mobile terminal to the one or more peripheral devices from which the corresponding profile information is received through the corresponding wireless communication.

10. The method of claim 2, further comprising selecting content from the listed content information, and downloading the selected content from the corresponding peripheral device.

11. The method of claim 10, wherein the profile information is received and the selected content is downloaded through a short range wireless communication protocol.

12. A mobile terminal, connectable to peripheral devices through corresponding wireless communication, for displaying information, the mobile terminal comprising:
   a communication unit for establishing and maintaining wireless connections with one or more peripheral devices through corresponding wireless communication; and
   a controller for receiving profile information from the one or more peripheral devices connected through the corresponding wireless communication, each received profile information having identification information identifying the corresponding one or more peripheral devices and content information on the corresponding one or more peripheral devices, and for listing the received profile information organized according to signal strength of the one or more peripheral devices from which the profile information is received.

13. The mobile terminal of claim 12, wherein the controller lists the content information identified in the received profile information organized according to the identification information in the received profile information for each of the one or more peripheral devices so as to allow a user to identify sharable content on each of the corresponding one or more peripheral devices.

14. The mobile terminal of claim 13, wherein the controller lists the content information according to a priority of content items based on the profile information received from the one or more peripheral devices.

15. The mobile terminal of claim 12, furthering comprising a display unit for displaying the received profile information in order of signal strength for the one or more peripheral devices.

16. The mobile terminal of claim 12, wherein the communication unit maintains the connection to the one or more peripheral devices using a short-range wireless communication protocol.

17. The mobile terminal of claim 12, further comprising, when at least one of the listed profile information is selected, displaying the content information identified in the selected profile information so as to allow the user to identify the sharable content on the peripheral device corresponding to the selected profile information.

18. The mobile terminal of claim 12, wherein the controller lists the received profile information according to the signal strength by detecting distance information for each of the one or more peripheral devices, and lists the received profile information according to a distance of the corresponding one or more peripheral devices to the mobile terminal.

19. The mobile terminal of claim 12, wherein the controller lists the received profile information about the one or more peripheral devices in ascending order of their network distances from the mobile terminal.

20. The mobile terminal of claim 13, wherein, when the content is selected from the listed content information, the controller controls the communication unit to download the selected content from the corresponding peripheral device through a short range wireless communication protocol.

* * * * *